United States Patent
Akamatsu et al.

(10) Patent No.: US 11,046,333 B2
(45) Date of Patent: Jun. 29, 2021

(54) METHOD AND DEVICE FOR CONTROLLING TRAVEL OF DRIVE-ASSISTED VEHICLE

(71) Applicant: Nissan Motor Co., Ltd., Yokohama (JP)

(72) Inventors: Yuta Akamatsu, Kanagawa (JP); Masahiro Kobayashi, Kanagawa (JP); Yasuhisa Taira, Kanagawa (JP); Osamu Fukata, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/632,917

(22) PCT Filed: Aug. 24, 2017

(86) PCT No.: PCT/JP2017/030256
§ 371 (c)(1),
(2) Date: Jan. 22, 2020

(87) PCT Pub. No.: WO2019/038872
PCT Pub. Date: Feb. 28, 2019

(65) Prior Publication Data
US 2020/0207372 A1 Jul. 2, 2020

(51) Int. Cl.
*B60W 60/00* (2020.01)
*G01C 21/34* (2006.01)
*G06K 9/00* (2006.01)

(52) U.S. Cl.
CPC .... *B60W 60/0018* (2020.02); *B60W 60/0025* (2020.02); *G01C 21/3492* (2013.01); *G06K 9/00798* (2013.01)

(58) Field of Classification Search
CPC .......... B60W 60/0018; B60W 60/0025; G06K 9/00798; G01C 21/3492
(Continued)

(56) References Cited

U.S. PATENT DOCUMENTS

| 6,363,311 B1 | 3/2002 | Kuroda et al. |
| 9,604,640 B2 * | 3/2017 | Yoshihama ........ B62D 15/0265 |

(Continued)

FOREIGN PATENT DOCUMENTS

| CN | 102632879 A | 8/2012 |
| CN | 104781121 A | 7/2015 |

(Continued)

*Primary Examiner* — Khoi H Tran
*Assistant Examiner* — Rodney P King
(74) *Attorney, Agent, or Firm* — Global IP Counselors, LLP

(57) ABSTRACT

A drive-assisted vehicle control device includes a controller that controls travel of a host vehicle. During travel on a curved route, the controller establishes a threshold value established as a boundary value for suppressing acceleration of the host vehicle. The threshold value is lower when another vehicle is present on an outside-peripheral-side curved route adjacent to a host-vehicle travel lane than when another vehicle is not present on the outside-peripheral-side curved route. The controller determines whether a lateral acceleration is greater than the threshold value during travel on a curved route. The controller permits accelerating travel on the curved route upon determining that the lateral acceleration is less than or equal to the threshold value, but suppresses accelerating travel on the curved route when upon determining that the lateral acceleration is greater than the threshold value.

6 Claims, 7 Drawing Sheets

(58) Field of Classification Search
USPC .......................................................... 701/23
See application file for complete search history.

(56) References Cited

U.S. PATENT DOCUMENTS

| | | | |
|---|---|---|---|
| 10,144,399 B2* | 12/2018 | Sugano | B60T 7/22 |
| 10,663,973 B2* | 5/2020 | Hashimoto | B60W 10/18 |
| 2003/0045991 A1 | 3/2003 | Isogai et al. | |
| 2013/0080019 A1* | 3/2013 | Isaji | B60W 30/18145 |
| | | | 701/96 |
| 2015/0197225 A1 | 7/2015 | Raste et al. | |
| 2016/0251014 A1 | 9/2016 | Tomiyama et al. | |
| 2018/0290657 A1* | 10/2018 | Ryne | B60W 30/0956 |
| 2019/0196465 A1* | 6/2019 | Hummelshoj | B60W 60/0015 |

FOREIGN PATENT DOCUMENTS

| | | |
|---|---|---|
| CN | 106004873 A | 10/2016 |
| JP | 11-42955 A | 2/1999 |
| JP | 2003-72416 A | 3/2003 |
| JP | 2006-256477 A | 9/2006 |
| JP | 2009-262895 A | 11/2009 |
| JP | 2010-105453 A | 5/2010 |
| JP | 5310745 B2 | 10/2013 |
| JP | 2017-1485 A | 1/2017 |
| JP | 2017-47710 A | 3/2017 |
| WO | 2015/178845 A1 | 11/2015 |

* cited by examiner

METHOD AND DEVICE FOR CONTROLLING TRAVEL OF DRIVE-ASSISTED VEHICLE

CROSS-REFERENCE TO RELATED APPLICATIONS

This application is a U.S. national stage application of International Application No. PCT/JP2017/030256, filed on Aug. 24, 2017.

BACKGROUND

Technical Field

The present disclosure relates to a method and device for controlling travel of a drive-assisted vehicle in which acceleration of a host vehicle on a curved route is suppressed when traveling along a host-vehicle travel lane.

Background Information

In the past, drive-assistance devices and drive-assistance methods have been known in which there is provided a curve determination unit that: determines whether there is a curved travel section, in which a vehicle travels on a curve; and prohibits acceleration due to an autonomous travel control in the curved travel section (for example, see Japanese Laid-Open Patent Application No. 2017-47710—Patent Document 1).

SUMMARY

However, in conventional devices, acceleration on curves is uniformly prohibited even when it is possible to travel on a desired trajectory on a curve due to control by a steering control system. Therefore, a driver can in some cases feel dissatisfied with the lack of acceleration. Moreover, the driver can feel more apprehensive upon deviating from the desired trajectory when another vehicle is present on the outside of the curved route, to a greater extent than when another vehicle is not present.

The present disclosure focuses on the above problems, it being an object of the present disclosure to reduce apprehensiveness on the part of a driver while allowing for a greater number of situations where it is possible to accelerate on a curved route.

In order to achieve the above object, the present disclosure is a method for controlling travel of a drive-assisted vehicle, wherein the method includes: establishing, during travel on a curved route, a turning behavior threshold value established as a boundary value for suppressing acceleration of a host vehicle, said threshold value being established so as to be lower when another vehicle is present on an outside-peripheral-side curved route adjacent to a host-vehicle travel lane than when another vehicle is not present on the outside-peripheral-side curved route; acquiring a turning behavior index value, which is a value for evaluating a turning behavior state of the host vehicle, during travel on the curved route, and determining whether the turning behavior index value is greater than the turning behavior threshold value; and permitting accelerating travel on the curved route while it has been determined that the turning behavior index value is less than or equal to the turning behavior threshold value, but suppressing accelerating travel on the curved route when it is determined that the turning behavior index value is greater than the turning behavior threshold value.

Thus, establishing the turning behavior threshold value established as a boundary value for suppressing acceleration of a host vehicle, specifically so that the threshold value is lower when another vehicle is present on the outside-peripheral-side curved route than when another vehicle is not present, makes it possible to reduce apprehensiveness on the part of a driver while allowing for a greater number of situations where it is possible to accelerate on a curved route.

DETAILED DESCRIPTION OF THE EMBODIMENTS

Figure 1:
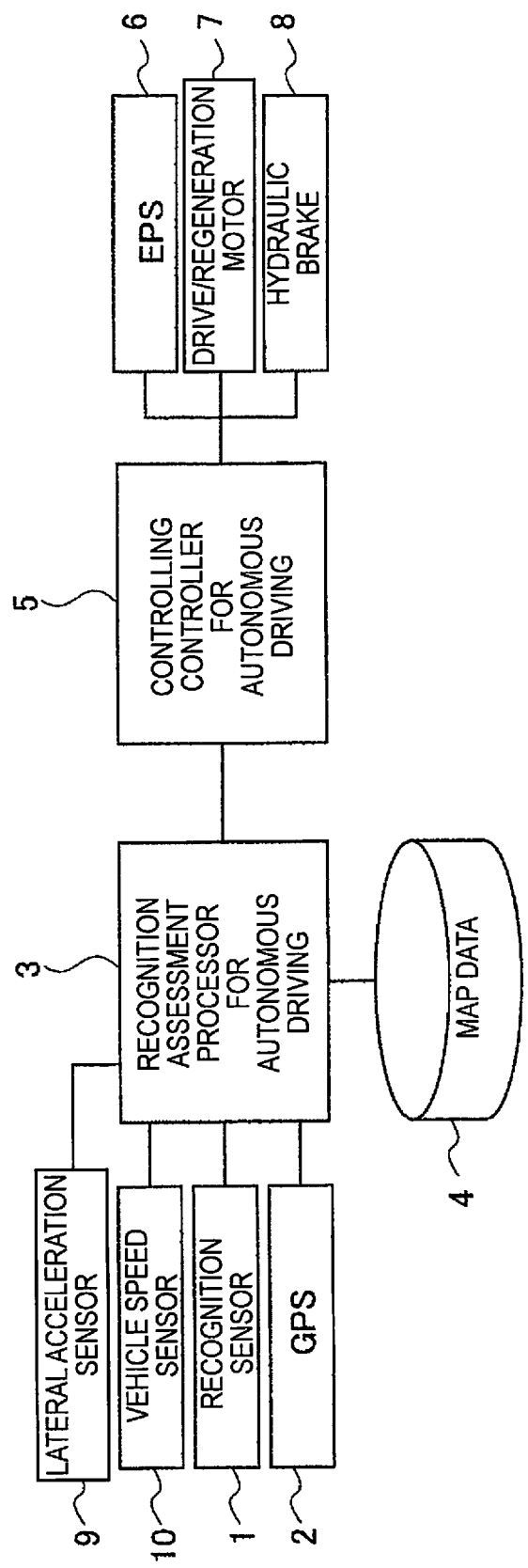
FIG. 1 is an overall configuration diagram showing a drive-assistance system mounted in a drive-assisted vehicle to which a travel control method and travel control device of the first embodiment are applied.

A preferred embodiment of the method and device for controlling traveling of a drive-assisted vehicle of the present disclosure is described below based on the first embodiment shown in the drawings.

First Embodiment

First, the configuration will be described. A travel control method and travel control device in the first embodiment are applied to a drive-assisted vehicle that has, as a base, an electric-powered vehicle including motor driving, the drive-assisted vehicle exhibiting, when an autonomous driving mode is selected, an autonomous drive function derived from control over steering/driving/braking along a lane in which a host vehicle is traveling. The configuration of the first embodiment is described below under the headings: "General Configuration of Drive-Assistance System," "Detailed Configuration of Recognition Assessment Processor for Autonomous Driving," And "Curved-Route Travel Control Process Configuration."

General Configuration of Drive-Assistance System

FIG. 1 shows a drive-assistance system mounted in a drive-assisted vehicle to which the travel control method and travel control device of the first embodiment are applied. A general configuration of the drive-assistance system is described below on the basis of FIG. 1.

The drive-assistance system is provided with a recognition sensor 1, a GPS 2, a recognition assessment processor 3 for autonomous driving, map data 4, a controlling controller 5 for autonomous driving, an electric-powered power steering 6, a drive/regeneration motor 7, a hydraulic brake 8, a lateral acceleration sensor 9, and a vehicle speed sensor 10, as shown in FIG. 1. Specifically, the recognition assessment processor 3 for autonomous driving and the controlling controller 5 for autonomous driving, which calculates control command values and transmits the control command values to actuator ECUs, are installed in the host vehicle as electronic control processing systems realized using a microcomputer. Description of the actuator ECUs is omitted.

The recognition sensor 1 is an onboard sensor provided in order to recognize an external environment in the vicinity of the host vehicle toward the front, the rear, and the left and right sides of the host vehicle. Representative examples include on-board vicinity recognition cameras and laser radar.

The GPS 2 is position detection means that is installed in the host vehicle and detects a travel position (latitude and longitude) of the host vehicle during travel. The term "GPS" is an abbreviation for "global positioning system."

The recognition assessment processor 3 for autonomous driving integrates information from the map data 4, the GPS 2, and the recognition sensor 1, and calculates various profiles such as a steering angle profile, a lateral acceleration profile, and a vehicle speed profile. Specifically, when a passenger designates a destination, a target travel route to the designated destination is computed on the basis of position information derived from the GPS 2 and the map data 4 stored in an on-board memory. During travel along the target travel route in a host-vehicle travel lane on the basis of position information derived from the GPS 2, the various profiles such as the steering angle profile, the lateral acceleration profile, and the vehicle speed profile are computed in accordance with a prescribed autonomous-driving control rule. When another vehicle is present in the host-vehicle travel lane or in a lane adjacent thereto, or when the host-vehicle travel lane is a curved route, the various profiles are successively revised on the basis of, inter alia, results of sensing the vicinity of the vehicle as obtained by the on-board recognition sensor 1.

The map data 4 is stored in the on-board memory and has road information written therein, such as a curvature of a curve, slope of a route surface, and a speed limit. The map data 4 is such that, when the travel position of the host vehicle during travel is detected by the GPS 2, map information centered about the travel position of the host vehicle is read out from the recognition assessment processor 3 for autonomous driving.

The controlling controller 5 for autonomous driving defines command values relating to a steering amount, a driving amount, and a braking amount on the basis of the various profiles from the recognition assessment processor 3 for autonomous driving. A steering control is configured to be performed by the electric-powered power steering 6, which is a steering actuator. A drive control is configured to be performed by the drive/regeneration motor 7, which is a drive source actuator. A braking control is configured to be performed in a distributed manner, partially through regeneration by the drive/regeneration motor 7 and partially through mechanical braking by the hydraulic brake 8. The steering control, the drive control, and the braking control are performed using ECUs provided to each of the actuators.

The electric-powered power steering 6 is a steering actuator that conducts autonomous steering in accordance with the control command value from the controlling controller 5 for autonomous driving. During autonomous steering, it is also possible for a driver to grasp a steering wheel and take control using manual steering.

The drive/regeneration motor 7 is a drive source actuator that conducts fixed-speed travel or accelerating travel derived from driving, or decelerating travel derived from regenerating, in accordance with the control command value from the controlling controller 5 for autonomous driving.

The hydraulic brake 8 is a brake actuator that conducts hydraulic braking in accordance with the control command value from the controlling controller 5 for autonomous driving.

The lateral acceleration sensor 9 is mounted in the host vehicle, detects a lateral acceleration generated in the host vehicle, and inputs the detected lateral acceleration to the recognition assessment processor 3 for autonomous driving. The vehicle speed sensor 10 is mounted in the host vehicle, detects a vehicle speed of the host vehicle, and inputs the detected vehicle speed to the recognition assessment processor 3 for autonomous driving.

Figure 2:
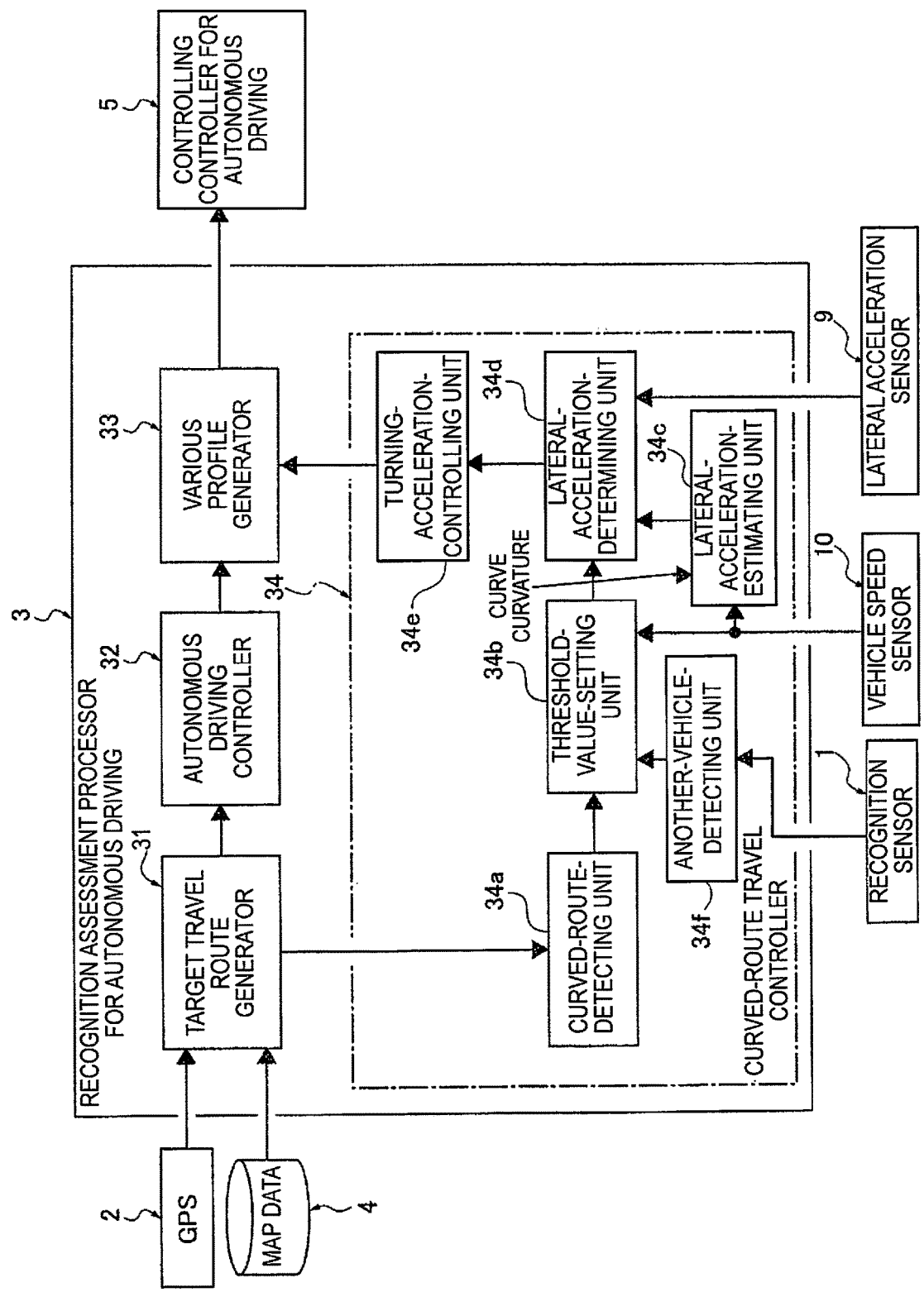
FIG. 2 is a control block diagram showing a detailed configuration of a recognition assessment processor for autonomous driving, which is provided to the drive-assistance system in FIG. 1.

Detailed Configuration of Recognition Assessment Processor for Autonomous Driving FIG. 2 shows a control block diagram of the recognition assessment processor 3 for autonomous driving, which is provided to the drive-assistance system in FIG. 1. A detailed configuration of the recognition assessment processor 3 for autonomous driving is described below on the basis of FIG. 2.

The recognition assessment processor 3 for autonomous driving is provided with a target travel route generator 31, an autonomous driving controller 32, a various profile generator 33, and a curved-route travel controller 34, as shown in FIG. 2.

When a manipulation to select autonomous driving is performed by the driver, the position information derived from the GPS 2 and the map data 4 stored in the on-board memory are inputted to the target travel route generator 31.

When the passenger designates the destination, the target travel route generator 31 generates the target travel route from a current position of the host vehicle to the destination according to a shortest-distance calculation, a cost calculation, etc., on the basis of host-vehicle position information, road information, etc. The target travel route is established at a position in a widthwise center of the host-vehicle travel lane.

The target travel route information is inputted from the target travel route generator 31 to the autonomous driving controller 32. The autonomous driving controller 32 calculates the target steering angle, the target lateral acceleration, the target vehicle speed, etc. from when the host vehicle travels by autonomous driving, in accordance with the autonomous-driving control rule.

The term "autonomous-driving control rule" refers to a control rule in which a headway control system for traveling while preserving a headway distance from a leading vehicle within a range of a vehicle speed established by the driver, and a lane-following control system that assists steering so as to maintain a position in the host-vehicle travel lane, are used in combination. In the headway control system, an established vehicle speed established by the driver is preserved when no leading vehicle has been detected. However, when a leading vehicle is detected, a control is performed so that the established vehicle speed is used as an upper limit and a headway from the leading vehicle is preserved, the headway corresponding to the vehicle speed. When the leading vehicle deviates from the host-vehicle travel lane due to a lane change, the host vehicle is caused to accelerate and return to the established vehicle speed.

The target steering angle, target lateral acceleration, target vehicle speed, etc., are inputted from the autonomous driving controller 32 to the various profile generator 33. The various profile generator 33 generates the steering angle profile, the lateral acceleration profile, and the vehicle speed profile, in which the target steering angle, the target lateral acceleration, and the target vehicle speed are represented according to characteristics along the target travel route. When the host-vehicle travel lane is a curved route, the various profiles are revised according to whether a "set prohibit-acceleration flag to 1" or "set prohibit-acceleration flag to 0" is inputted from a turning-acceleration-controlling unit 34e. The various profiles generated by the various profile generator 33 are outputted to the controlling controller 5 for autonomous driving.

The curved-route travel controller 34 has a curved-route-detecting unit 34a, a threshold-value-establishing unit 34b (turning-behavior-threshold-value-establishing unit), a lateral-acceleration-estimating unit 34c, a lateral-acceleration-determining unit 34d (turning-behavior-index-value-determining unit), the turning-acceleration-controlling unit 34e, and an another-vehicle-detecting unit 34f.

The target travel route generated by the target travel route generator 31 is inputted to the curved-route-detecting unit 34a. During travel along the host-vehicle travel lane, the curved-route-detecting unit 34a detects a curved route present in the target travel route, which is the travel planned route of the host vehicle. When a curved route is detected, the curved-route-detecting unit 34a acquires curve curvature information about the curved route, the information being detected at the same time as the curved route.

Information about the presence of another vehicle from the other-vehicle-detecting unit 34f and vehicle speed information from the vehicle speed sensor 10 are inputted to the threshold-value-establishing unit 34b. The threshold-value-establishing unit 34b establishes an acceleration-prohibited lateral acceleration threshold value, which is established as a boundary value for prohibiting acceleration of the host vehicle on the curved route, so as to be lower when another vehicle is present on an outside-peripheral-side curved route than when another vehicle is not present on the outside-peripheral-side curved route. The threshold-value-establishing unit 34b does not merely establish the acceleration-prohibited lateral acceleration threshold value so as to be low under all circumstances when another vehicle is present on the outside-peripheral-side curved route, but rather establishes the acceleration-prohibited lateral acceleration threshold value so as to be low when another vehicle is present on the outside-peripheral-side curved route and the other vehicle is approaching the host vehicle. Specifically, even if another vehicle is present on the outside-peripheral-side curved route, the acceleration-prohibited lateral acceleration threshold value is established at a normal value when the other vehicle is not approaching the host vehicle. The other-vehicle-detecting unit 34f detects whether another vehicle is present or not present in the vicinity of the host vehicle on the basis of recognition information relating to the vicinity of the host vehicle from the recognition sensor 1.

The curve curvature information from the curved-route-detecting unit 34a and the vehicle speed information from the vehicle speed sensor 10 are inputted to the lateral-acceleration-estimating unit 34c. The lateral-acceleration-estimating unit 34c computes, using the curvature of the curve and the vehicle speed, an estimated lateral acceleration estimated to be generated in the host vehicle.

The acceleration-prohibited lateral acceleration threshold value from the threshold-value-establishing unit 34b, the estimated lateral acceleration information from the lateral-acceleration-estimating unit 34c, and the lateral acceleration information generated in the host vehicle as acquired from the lateral acceleration sensor 9 are inputted to the lateral-acceleration-determining unit 34d. The lateral-acceleration-determining unit 34d outputs a determination that acceleration is permitted during travel on a curved route while the estimated lateral acceleration is equal to or less than the acceleration-prohibited lateral acceleration threshold value, or while the lateral acceleration generated in the host vehicle is equal to or less than the acceleration-prohibited lateral acceleration threshold value. However, the lateral-acceleration-determining unit 34d outputs a determination that acceleration is prohibited during travel on a curved route when the estimated lateral acceleration is greater than the acceleration-prohibited lateral acceleration threshold value and the lateral acceleration generated in the host vehicle is greater than the acceleration-prohibited lateral acceleration threshold value. The estimated lateral acceleration information from the lateral-acceleration-estimating unit 34c and the lateral acceleration information from the lateral acceleration sensor 9 correspond to turning behavior index values, which are values for evaluating a turning behavior state of the host vehicle, during travel on a curved route.

A determination result from the lateral-acceleration-determining unit 34d is inputted to the turning-acceleration-controlling unit 34e. When a determination that acceleration is permitted is inputted from the lateral-acceleration-determining unit 34d, the turning-acceleration-controlling unit 34e outputs "set prohibit-acceleration flag to 0", which permits accelerating travel on the curved route, to the various profile generator 33. However, when a determination that acceleration is prohibited is inputted from the lateral-acceleration-determining unit 34d, the turning-acceleration-controlling unit 34e outputs "set prohibit-acceleration flag to 1", which prohibits accelerating travel on the curved route, to the various profile generator 33.

Curved-Route Travel Control Process Configuration

Figure 3:
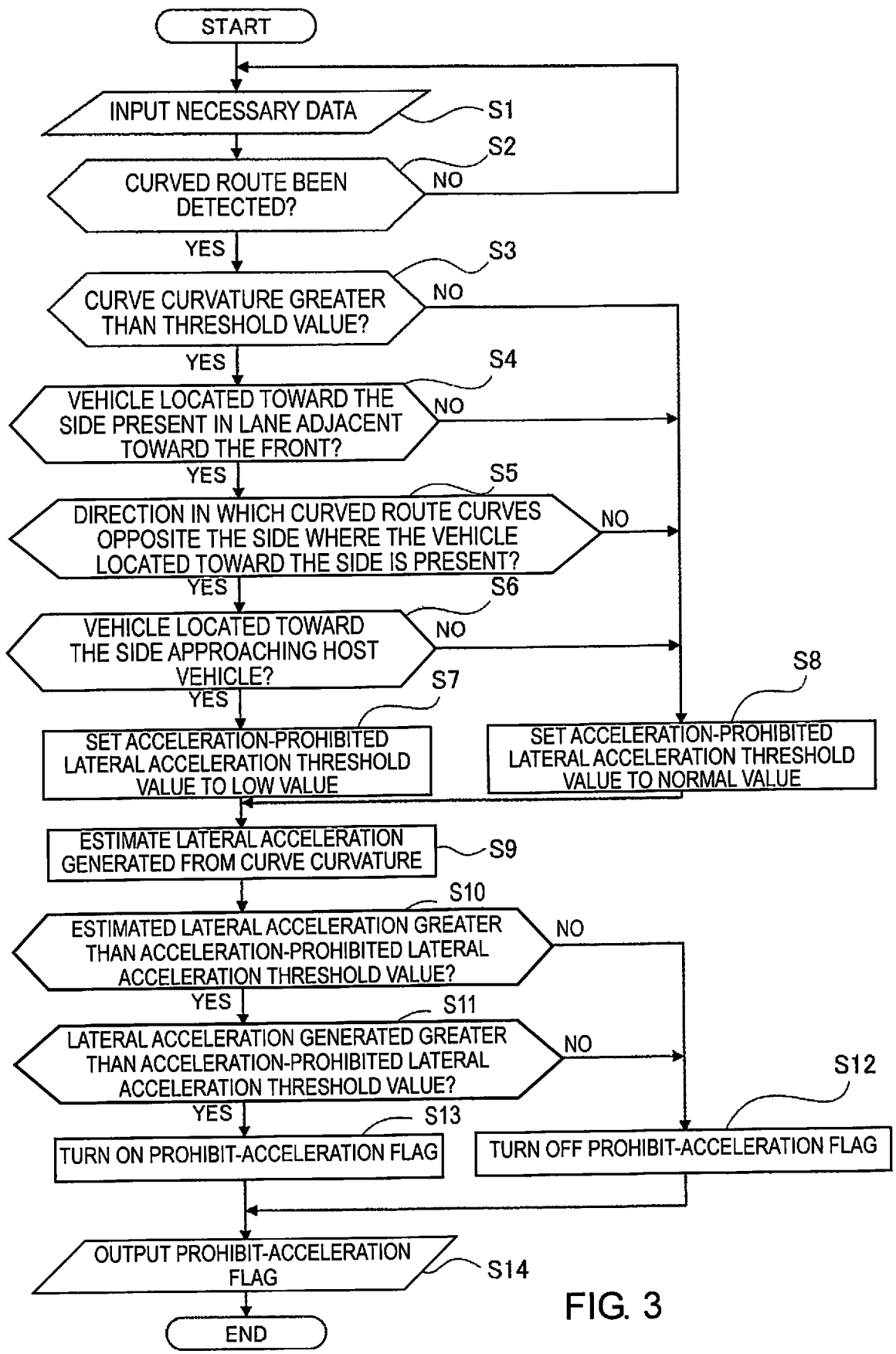
FIG. 3 is a flow chart showing a flow of a curved-route travel control process executed by a curved-route travel controller provided to the recognition assessment processor for autonomous driving in FIG. 2.

FIG. 3 shows a flow of a curved-route travel control process executed by the curved-route travel controller 34 provided to the recognition assessment processor 3 for autonomous driving in FIG. 2. Steps in a flow chart shown in FIG. 3 are described below.

In step S1, following from a start of a curved-route travel control, necessary data used in the curved-route travel control is inputted, and the process advances to step S2.

In step S2, following from the input of necessary data in step S1, an assessment is made as to whether a curved route has been detected. If YES (a curved route has been detected), the process advances to step S3. If NO (no curved route has been detected), the process returns to step S1.

In step S3, following from the assessment in step S2 that a curved route has been detected, an assessment is made as to whether a curvature of the curve in the curved route is greater than a threshold value. If YES (the curvature of the curve is greater than the threshold value), the process advances to step S4. If NO (the curvature of the curve is less than or equal to the threshold value), the process advances to step S8.

The "curve curvature threshold value" is established at a value that excludes curved routes having low curve curvatures such that substantially no lateral displacement occurs in the host vehicle even when the steering angle is low and the vehicle is traveling through at a high speed, i.e., curved routes that have a large curve radius and are close to being linear routes.

In step S4, following from the assessment in step S3 that the curve curvature is greater than the threshold value, an assessment is made as to whether a vehicle located toward the side (another vehicle) is present in an adjacent lane forward of the host vehicle. If YES (a vehicle located toward the side is present in an adjacent lane), the process advances to step S5. If NO (no vehicle located toward the side is present in an adjacent lane), the process advances to step S8.

In step S5, following from the assessment in step S4 that a vehicle located toward the side is present in an adjacent lane, an assessment is made as to whether a direction in which the curved route curves is on the opposite side from that where the vehicle located toward the side is present. If YES (the direction of the curve is on the opposite side from that where the vehicle located toward the side is present), the process advances to step S6. If NO (the direction of the curve is on the same side as that where the vehicle located toward the side is present), the process advances to step S8.

The phrase "the direction of the curve is on the opposite side from that where the vehicle located toward the side is present" refers to a situation where the other vehicle is present on an outside-peripheral-side curved route adjacent to the host-vehicle travel lane. The phrase "the direction of the curve is on the same side as that where the vehicle located toward the side is present" refers to a situation where the other vehicle is present on an inside-peripheral side of a curved route adjacent to the host-vehicle travel lane.

In step S6, following from the assessment in step S5 that the direction of the curve is on the opposite side from that where the vehicle located toward the side is present, an assessment is made as to whether the vehicle located toward the side (other vehicle), which is present on the outside-peripheral-side curved route adjacent to the host-vehicle travel lane, is approaching the host vehicle. If YES (the other vehicle is approaching the host vehicle), the process advances to step S7. If NO (the other vehicle is not approaching the host vehicle), the process advances to step S8.

The assessment of whether the other vehicle and the host vehicle are approaching closer to each other is conducted by: calculating a time to collision (TTC) and a time headway (THW) from a relative speed of the other vehicle and the host vehicle, and also from relative distance information; quantifying a degree of approach; and assessing whether a value of the degree of approach is decreasing or increasing over time.

In step S7, following from the assessment in step S6 that the other vehicle is approaching the host vehicle, the acceleration-prohibited lateral acceleration threshold value for prohibiting acceleration on a curved route is established so as to be lower than a normal threshold value, and the process advances to step S9.

The acceleration-prohibited lateral acceleration threshold value established in step S7 is established at a value obtained by subtracting a further-turning margin from an upper-limit lateral acceleration, which is limited by the lane-following control system or a steering assistance control device, during travel on a curved route at a vehicle speed in effect at that time.

In step S8, following from the assessment in any of steps S3, S4, S5, and S6 that resulted in NO, the acceleration-prohibited lateral acceleration threshold value for prohibiting acceleration on a curved route is established at the normal threshold value, and the process advances to step S9.

The acceleration-prohibited lateral acceleration threshold value established in step S8 is established at a value in which the further-turning margin is suppressed from the upper-limit lateral acceleration, which is limited by the lane-following control system or the steering assistance control device, during travel on a curved route at a vehicle speed in effect at that time.

In step S9, following from the establishing in step S7 or step S8 of the acceleration-prohibited lateral acceleration threshold value, the lateral acceleration generated from the curve curvature of the curved route at that time is estimated, and the process advances to step S10.

The "lateral acceleration generated from the curve curvature" is an estimated lateral acceleration computed on the basis of the curve curvature and the vehicle speed.

In step S10, following from the estimation in step S9 of the lateral acceleration generated from the curve curvature, an assessment is made as to whether the estimated lateral acceleration is greater than the acceleration-prohibited lateral acceleration threshold value established in step S7 or step S8. If YES (the estimated lateral acceleration is greater than the acceleration-prohibited lateral acceleration threshold value), the process advances to step S11. If NO (the estimated lateral acceleration is less than or equal to the acceleration-prohibited lateral acceleration threshold value), the process advances to step S12.

In step S11, following from the assessment in step S10 that the estimated lateral acceleration is greater than the acceleration-prohibited lateral acceleration threshold value, an assessment is made as to whether the lateral acceleration generated in the host vehicle as acquired from the lateral acceleration sensor 9 is greater than the acceleration-prohibited lateral acceleration threshold value established in step S7 or step S8. If YES (the lateral acceleration generated is greater than the acceleration-prohibited lateral acceleration threshold value), the process advances to step S13. If NO (the lateral acceleration generated is less than or equal to the acceleration-prohibited lateral acceleration threshold value), the process advances to step S12.

In step S12, following from the assessment in step S10 that the estimated lateral acceleration is less than or equal to the acceleration-prohibited lateral acceleration threshold value, or following from the assessment in step S11 that the lateral acceleration generated is less than or equal to the acceleration-prohibited lateral acceleration threshold value, the prohibit-acceleration flag is turned OFF (prohibit-acceleration flag is set to 0), and the process advances to step S14.

In step S13, following from the assessment in step S10 that the estimated lateral acceleration is greater than the acceleration-prohibited lateral acceleration threshold value and the assessment in step S11 that the lateral acceleration generated is greater than the acceleration-prohibited lateral acceleration threshold value, the prohibit-acceleration flag is turned ON (prohibit-acceleration flag is set to 1), and the process advances to step S14.

In step S14, after being set to 0 in step S12 or to 1 in step S13, the acceleration prohibition flag is outputted to the various profile generator 33, and the process ends.

The operation is described next. The operation of the first embodiment is described below under the headings: "Background technology," "Operation of Curved-Route Travel Control," "Operation of Curved-Route Travel Control in Situation Where There is No Vehicle Traveling on Outside-Peripheral-Side Curved Route," and "Operation of Curved-Route Travel Control in Situation Where There is a Vehicle Traveling on Outside-Peripheral-Side Curved Route."

BACKGROUND TECHNOLOGY

As a system for assisting the driver with driving, there is a system in which a headway control system for traveling while preserving a distance from a leading vehicle within a range of a vehicle speed established by the driver, and a lane-following control system that assists steering so as to maintain a position in a lane, are used in combination.

In the case of the drive-assistance system, when the host vehicle has entered a curved route during travel while following a leading vehicle, and when the leading vehicle has accelerated during travel on the curved route, the host vehicle autonomously accelerates to the established vehicle speed due to the headway control by the headway control system. Therefore, when the travel vehicle speed of the host vehicle is excessively high during travel on a curved route, there is a risk that it could be impossible to maintain the position in the lane even using a lane-maintaining control performed by the lane-following control system, and that the host vehicle will not adhere to the desired trajectory (e.g., a center of the lane), veering toward the outside-peripheral-side curved route and away from the desired trajectory.

However, it is known that determining whether there is a curved travel section from the state of a vehicle on a curved route and preventing acceleration in the curved travel section enhances both safety and comfort in vehicle travel (for example, Japanese Laid-Open Patent Application No. 2017-47710).

In the background technology, a configuration is adopted in which acceleration is prohibited when it is determined from the state of a vehicle that there is a curved travel section. Therefore, acceleration of a host vehicle is prohibited in a situation that involves traveling on a curved route, irrespective of whether another vehicle is present in the vicinity of the host vehicle or whether another vehicle is not present in the vicinity of the host vehicle.

However, due to a steering control device that permits the driver to take control of steering, it is possible for the driver to further turn the steering wheel and thereby travel without deviating from the desired trajectory even during travel at speeds at which it is impossible to maintain the position in the lane on a curved route. Therefore, if acceleration is uniformly prohibited on curved routes, the driver could feel dissatisfied with the lack of acceleration.

In a case in which another vehicle is present on the outside-peripheral-side curved route, when the host vehicle deviates from the desired trajectory (e.g., the center of the lane), the host vehicle approaches the other vehicle, and the driver feels more apprehensive in response to the approach to a greater extent than when another vehicle is not present. In particular, in a situation where the host vehicle autonomously accelerates on the curved route while following a leading vehicle, the driver feels even more apprehensive in response to the host vehicle deviating from the desired trajectory and approaching the other vehicle.

However, a threshold value for prohibiting acceleration in a situation that involves traveling on a curved route is established according to a fixed value irrespective of whether another vehicle is present on the outside-peripheral-side curved route, and a value for permitting acceleration during travel on the curved route is adopted so that dissatisfaction in response to the lack of acceleration is eliminated. In this case, when another vehicle is present on the outside-peripheral-side curved route, the host vehicle could accelerate irrespective of whether the host vehicle has deviated from the desired trajectory (e.g., the center of the lane) or whether the driver is experiencing apprehensiveness in response to approaching the other vehicle.

Operation of Curved-Route Travel Control

In the first embodiment, in contrast to the background technology, the acceleration-prohibited lateral acceleration threshold value at which acceleration of the host vehicle is suppressed during travel on a curved route is established so as to be lower when another vehicle is present on an outside-peripheral-side curved route adjacent to the host-vehicle travel lane than when another vehicle is not present on the outside-peripheral-side curved route (steps S1 to S8 in FIG. 3). During travel on a curved route, the acceleration-prohibited lateral acceleration threshold value is compared with the lateral acceleration of the host vehicle (steps S9 to S11 in FIG. 3). While the lateral acceleration of the host vehicle is less than or equal to the lateral acceleration of the host vehicle, accelerating travel on the curved route is permitted (flow from step S12 to step S14 in FIG. 3). However, when the lateral acceleration of the host vehicle is greater than the acceleration-prohibited lateral acceleration threshold value during travel on the curved route, accelerating travel on the curved route is prohibited (flow from step S13 to step S14 in FIG. 3).

Specifically, when a curved route is detected, a curve curvature condition (step S3), an another-vehicle-presence condition (step S4), an outside-peripheral-side curved route presence condition (step S5), and a host vehicle approach condition (step S6) are assessed, as shown in the flow chart in FIG. 3. When all of the conditions in steps S3, S4, S5, and S6 are satisfied, the process advances to step S7. In step S7, the acceleration-prohibited lateral acceleration threshold value is established so as to be lower than a normal threshold value.

However, if any condition from among the conditions in steps S3, S4, S5, and S6 is not satisfied, the process in the flow chart in FIG. 3 advances to step S8. In step S8, the acceleration-prohibited lateral acceleration threshold value is established at a normal threshold value.

When the acceleration-prohibited lateral acceleration threshold value is established in step S7 or step S8, the process advances through step S9 to step S10. In step S9, the lateral acceleration generated from the curve curvature on the curved route at that time is estimated. In the subsequent step S10, an assessment is made as to whether the estimated lateral acceleration is greater than the acceleration-prohibited lateral acceleration threshold value established in step S7 or step S8. In step S11, an assessment is made as to whether the lateral acceleration generated in the host vehicle as acquired from the lateral acceleration sensor 9 is greater than the acceleration-prohibited lateral acceleration threshold value established in step S7 or step S8.

When it is assessed in step S10 that the estimated lateral acceleration is less than or equal to the acceleration-prohibited lateral acceleration threshold value, the process advances to step S12. Alternatively, when it is assessed in step S10 that the estimated lateral acceleration is greater than the acceleration-prohibited lateral acceleration threshold value but it is assessed in step S11 that the lateral acceleration generated is less than or equal to the acceleration-prohibited lateral acceleration threshold value, the process similarly advances to step S12. In step S12, the prohibit-acceleration flag is turned OFF (prohibit-acceleration flag is set to 0).

However, if it is assessed in step S10 that the estimated lateral acceleration is greater than the acceleration-prohibited lateral acceleration threshold value and it is assessed in step S11 that the lateral acceleration generated is greater than the acceleration-prohibited lateral acceleration threshold value, the process advances to step S13. In step S13, the prohibit-acceleration flag is turned ON (prohibit-acceleration flag is set to 1).

In step S14, when the prohibit-acceleration flag has been set to 0 in step S12 or set to 1 in step S13, the set prohibit-acceleration flag is outputted to the various profile generator 33.

Thus, the computed information about the estimated lateral acceleration and the detected information about the lateral acceleration generated in the host vehicle are used to set the prohibit-acceleration flag to 0 while either of the computed information and the detected information about the lateral acceleration is less than or equal to the acceleration-prohibited lateral acceleration threshold value. When both pieces of information are greater than the acceleration-prohibited lateral acceleration threshold value, the prohibit-acceleration flag is set to 1.

Therefore, when another vehicle is not present on the outside-peripheral-side curved route, the acceleration-prohibited lateral acceleration threshold value for prohibiting acceleration during travel on a curved route is established at a high value. Thus, the timing for setting the prohibit-acceleration flag is delayed, whereby acceleration of the host vehicle toward an entry to a curved route is permitted, and/or it is possible to travel the entirety of the curved route without the prohibit-acceleration flag being set. Therefore, it is possible to travel on a curved route at a speed close to the vehicle speed established by the driver. Specifically, this eliminates driver dissatisfaction that would arise when acceleration during travel on a curved route is uniformly prohibited.

However, when another vehicle is present on the outside-peripheral-side curved route, the acceleration-prohibited lateral acceleration threshold value for prohibiting acceleration during travel on a curved route is established at a lower value than when another vehicle is not present on the outside-peripheral-side curved route. Thus, the prohibit-acceleration flag is set at an early timing, and acceleration on the curved route is prohibited. Therefore, during travel on the curved route, a turning travel trajectory of the host vehicle is prevented from veering toward the outside-peripheral-side curved route, and it is possible to enhance conformity between an actual travel trajectory of the host vehicle and the desired travel trajectory.

For example, when another vehicle is present on the outside-peripheral-side curved route during travel using a lane-following control on a curved route having a plurality of lanes, the driver feels more apprehensive in response to deviation from the desired trajectory and approaching the other vehicle to a greater extent than when another vehicle is not present, as described above. However, during entry to the curved route, the prohibit-acceleration flag is set at an early timing, whereby it is possible to prohibit acceleration before the driver experiences apprehensiveness related to approaching the other vehicle.

Figure 4:
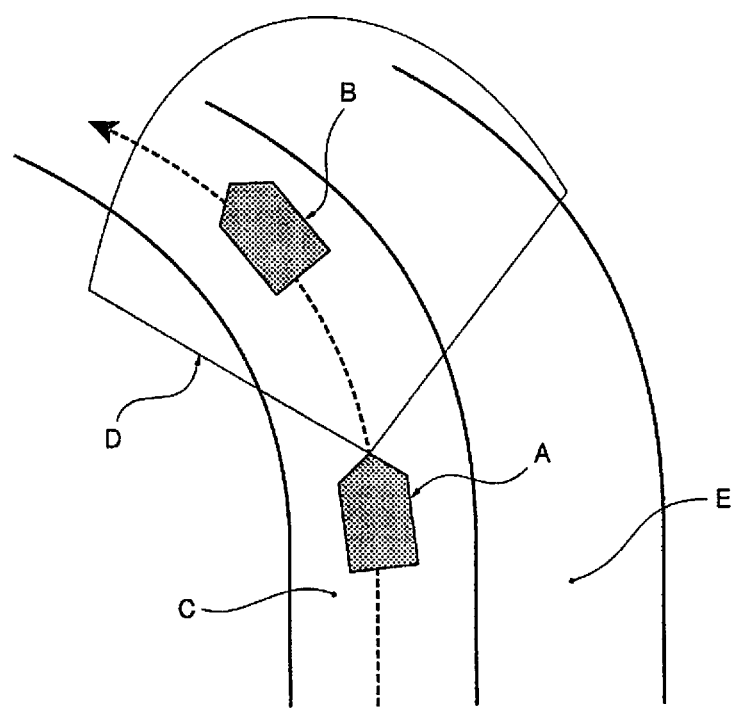
FIG. 4 is an operation diagram showing an overview of a case in which a host vehicle is turning on a curved route in a situation where there is no vehicle traveling on an outside-peripheral-side curved route.
Figure 5:
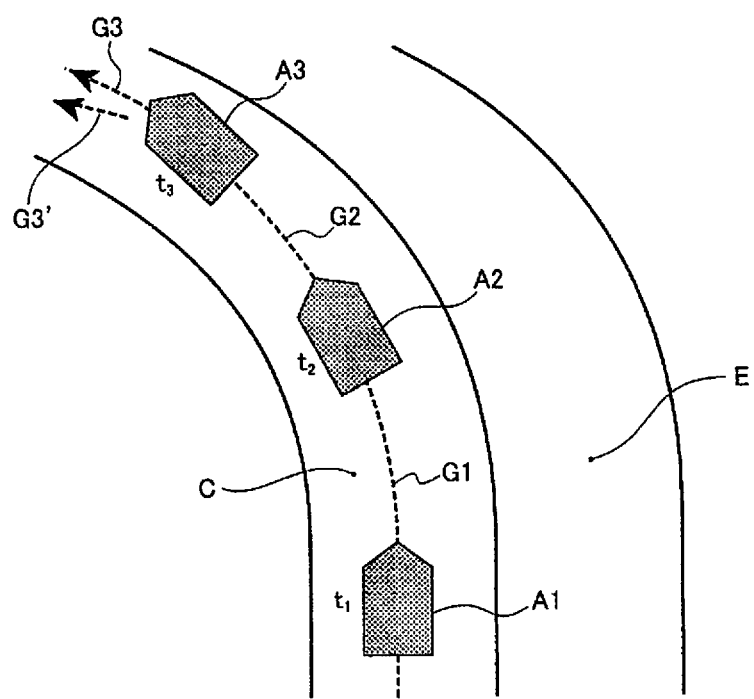
FIG. 5 is an operation diagram showing a change in position of the host vehicle over time in a case in which the host vehicle is turning on a curved route in a situation in which there is no vehicle traveling on the outside-peripheral-side curved route.
Figure 6:
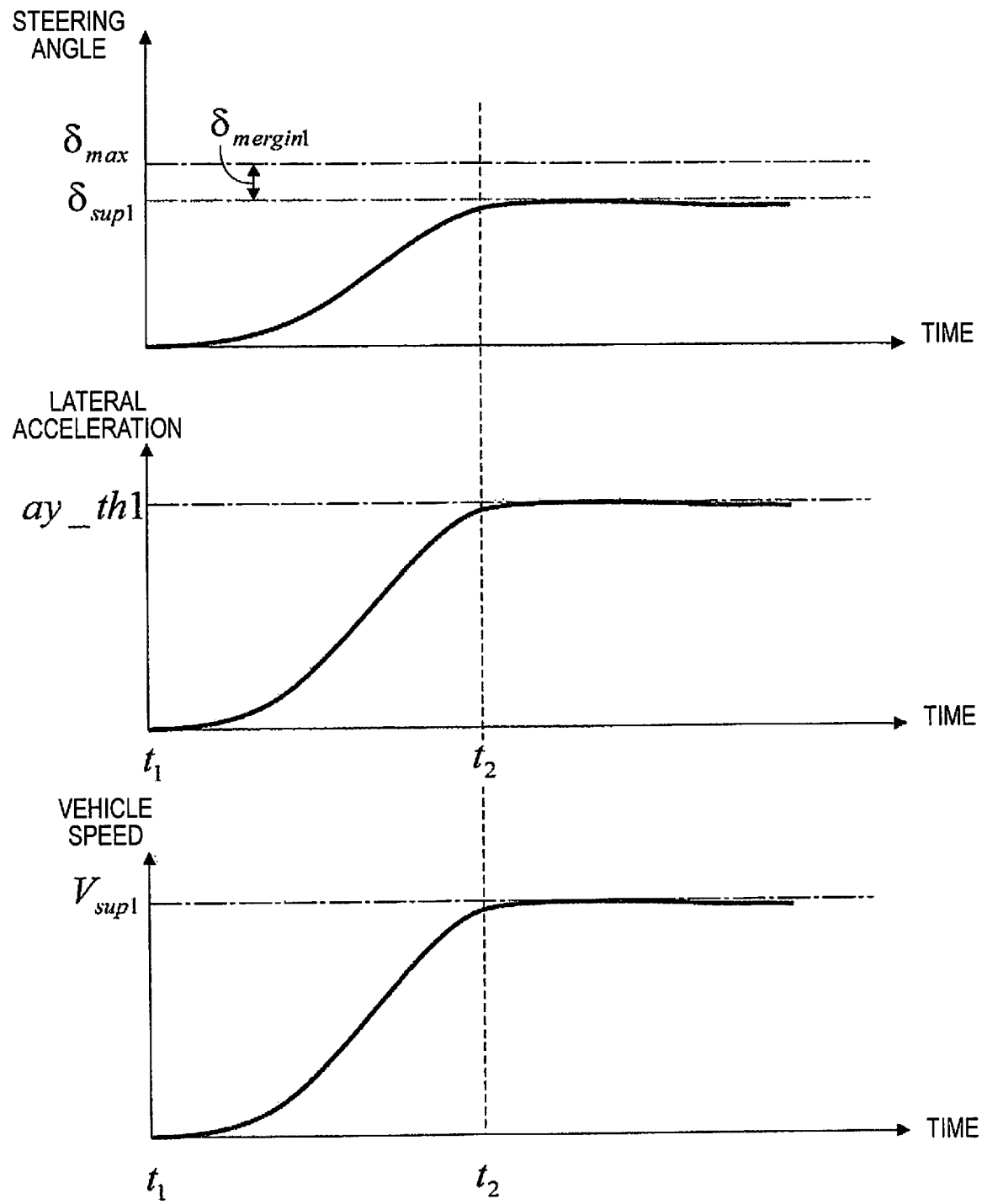
FIG. 6 is a time chart showing a steering angle profile, a lateral acceleration profile, and a vehicle speed profile in which a target steering angle, a target lateral acceleration, and a target vehicle speed of the host vehicle are represented with respect to time in a case in which the host vehicle is turning on a curved route in a situation in which there is no vehicle traveling on the outside-peripheral-side curved route.

Operation of Curved-Route Travel Control In Situation where there is No Vehicle Traveling on Outside-Peripheral-Side Curved Route FIG. 4 shows an overview of a case in which a host vehicle is turning on a curved route in a situation where there is no vehicle traveling on an outside-peripheral-side curved route. FIG. 5 shows a change in position of the host vehicle over time in the same situation. FIG. 6 shows a various profiles with respect to time in the same situation. An operation of curved-route travel control in a situation where there is no vehicle traveling on the outside-peripheral-side curved route is described below on the basis of FIGS. 4 to 6.

FIG. 4 shows a scenario in which a host vehicle A enters a curved route on a host-vehicle travel lane C while following a leading vehicle B according to a headway control system, and the leading vehicle B accelerates while traveling on the curved route. In this scenario, a recognition sensor 1 (camera, radar, laser, sonar, etc.) installed in the host vehicle is used to determine whether another vehicle F is present on an outside-peripheral-side curved route E included in a recognition range D forward of the host vehicle. As shown in FIG. 4, when another vehicle F is not present on the outside-peripheral-side curved route E, an acceleration-prohibited lateral acceleration threshold value ay_th1 for prohibiting acceleration while on a curve is established at a normal value close to a steering-angle limit of a steering assistance device. The same applies to a case in which, for example, a driver changes an established vehicle speed during travel on the curved route and the headway control system accelerates because the established vehicle speed has increased to a value higher than the current vehicle speed, said case being unrelated to the presence of the leading vehicle B.

FIG. 5 shows a scenario in which, when the host vehicle A enters the curved route on the host-vehicle travel lane C, another vehicle F is not present on the outside-peripheral-side curved route E. At time $t_1$ in FIG. 5, when the leading vehicle B has accelerated, the host vehicle A1 starts accelerating according to the headway control system. In a period from time $t_1$, when the host vehicle A1 has started accelerating, to time $t_2$, at which the lateral acceleration generated in the host vehicle A1 is less than or equal to the normal acceleration-prohibited lateral acceleration threshold value ay_th1, "set prohibit-acceleration flag to 0" is outputted from the curved-route travel controller 34.

Thus, from time $t_1$ to time $t_2$, the host vehicle travels on the curved route such that acceleration during travel on the curved route is permitted, and such that an increase in a steering angle $\delta$ to a steering angle $\delta_{sup1}$, an increase in a lateral acceleration ay to the acceleration-prohibited lateral acceleration threshold value ay_th1, and an increase in a vehicle speed V to a vehicle speed $V_{sup1}$ are permitted, as shown in FIG. 6.

The normal acceleration-prohibited lateral acceleration threshold value ay_th1, which is an upper-limit value of the lateral acceleration ay, is a value close to an upper-limit lateral acceleration for defining the steering-angle limit of the steering assistance device and is established at a relatively low value. Therefore, even if an increase in the lateral acceleration ay to the acceleration-prohibited lateral acceleration threshold value ay_th1 is permitted, a travel trajectory G1 from a position of the host vehicle A1 to that of the host vehicle A2 does not veer or deviate toward the outside-peripheral-side curved route E from a trajectory in the center of the host-vehicle travel lane C that is the desired trajectory during travel on a corner route from the position of the host vehicle A1 to that of the host vehicle A2 in FIG. 5.

At time $t_2$ in FIG. 5, when the lateral acceleration generated in the host vehicle A2 reaches the normal acceleration-prohibited lateral acceleration threshold value ay_th1 for prohibiting acceleration during travel on a curved route, "set prohibit-acceleration flag to 1" is outputted from the curved-route travel controller 34.

Thus, after time $t_2$ has occurred, acceleration during travel on the curved route is prohibited, and the host vehicle travels on the curved route while the steering angle $\delta_{sup1}$ at time $t_2$, the lateral acceleration (acceleration-prohibited lateral acceleration threshold value ay_th1) at time $t_2$, and the vehicle speed $V_{sup}1$ at time $t_2$ are maintained, as shown in FIG. 6.

The normal acceleration-prohibited lateral acceleration threshold value ay_th1 is established at a relatively lower value than the upper-limit lateral acceleration for defining the steering-angle limit of the steering assistance device. Therefore, when the acceleration-prohibited lateral acceleration threshold value ay_th1 is maintained, a travel trajectory G2 from a position of the host vehicle A2 to that of the host vehicle A3 does not deviate from the desired trajectory unless the curve radius toward the front decreases during travel on the corner route from the position of the host vehicle A2 to that of the host vehicle A3 in FIG. 5.

At time $t_3$ in FIG. 5, when an effort has been made to maintain the trajectory in the center of the host-vehicle travel lane C, the curve radius toward the front of the host vehicle A3 decreases, and a travel trajectory G3 of the host vehicle A3 is changed to a travel trajectory G3'. In this case, as shown in FIG. 6, it is possible to turn further, due to steering assistance, by a margin $\delta_{margin1}$ from the steering angle $\delta_{sup1}$ when acceleration is prohibited due to the normal acceleration-prohibited lateral acceleration threshold value ay_th1 to a steering-angle limit $\delta_{max}$ in the steering assistance. Therefore, even when the travel trajectory G3 from the host vehicle A3 changes to the travel trajectory G3', the host vehicle A3 will achieve curved-route travel along the travel trajectory G3' that is the desired trajectory from the host vehicle A3 and will not deviate from the desired trajectory, as long as it is possible to respond within the range of turning further by the steering angle $\delta$.

Figure 7:
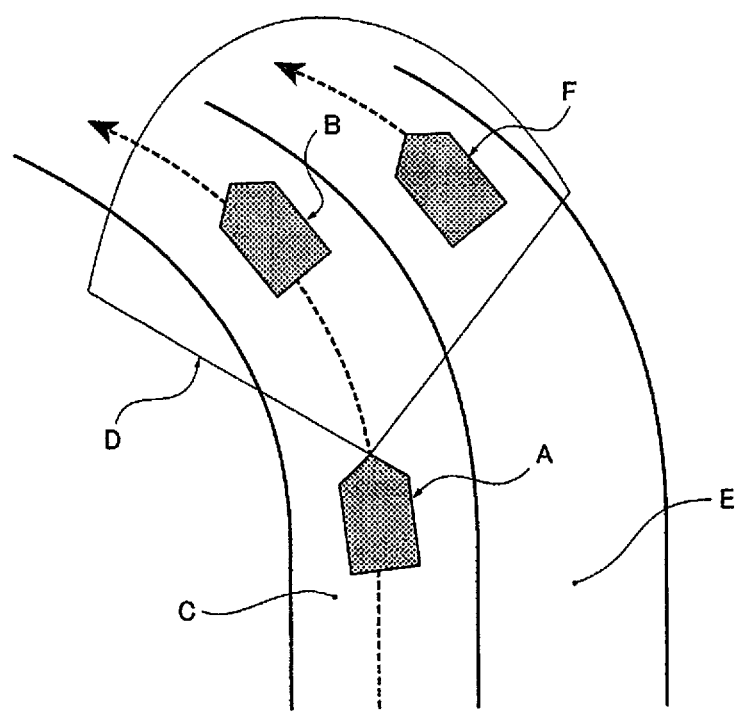
FIG. 7 is an operation diagram showing an overview of a case in which the host vehicle is turning on a curved route in a situation where there is a vehicle traveling on the outside-peripheral-side curved route.
Figure 8:
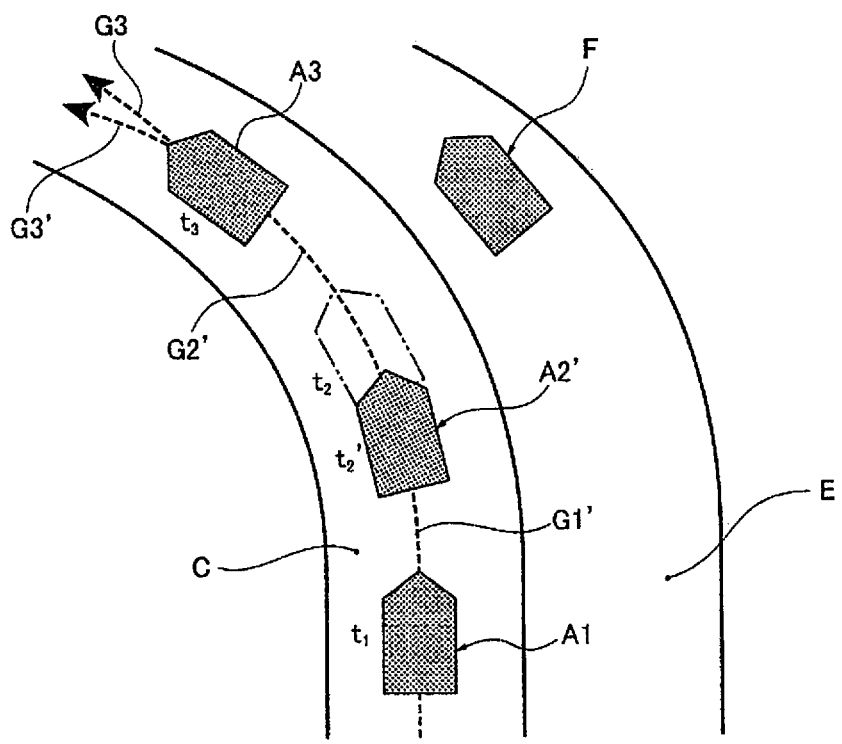
FIG. 8 is an operation diagram showing a change in position of the host vehicle over time in a case in which the host vehicle is turning on a curved route in a situation where there is a vehicle traveling on the outside-peripheral-side curved route.
Figure 9:
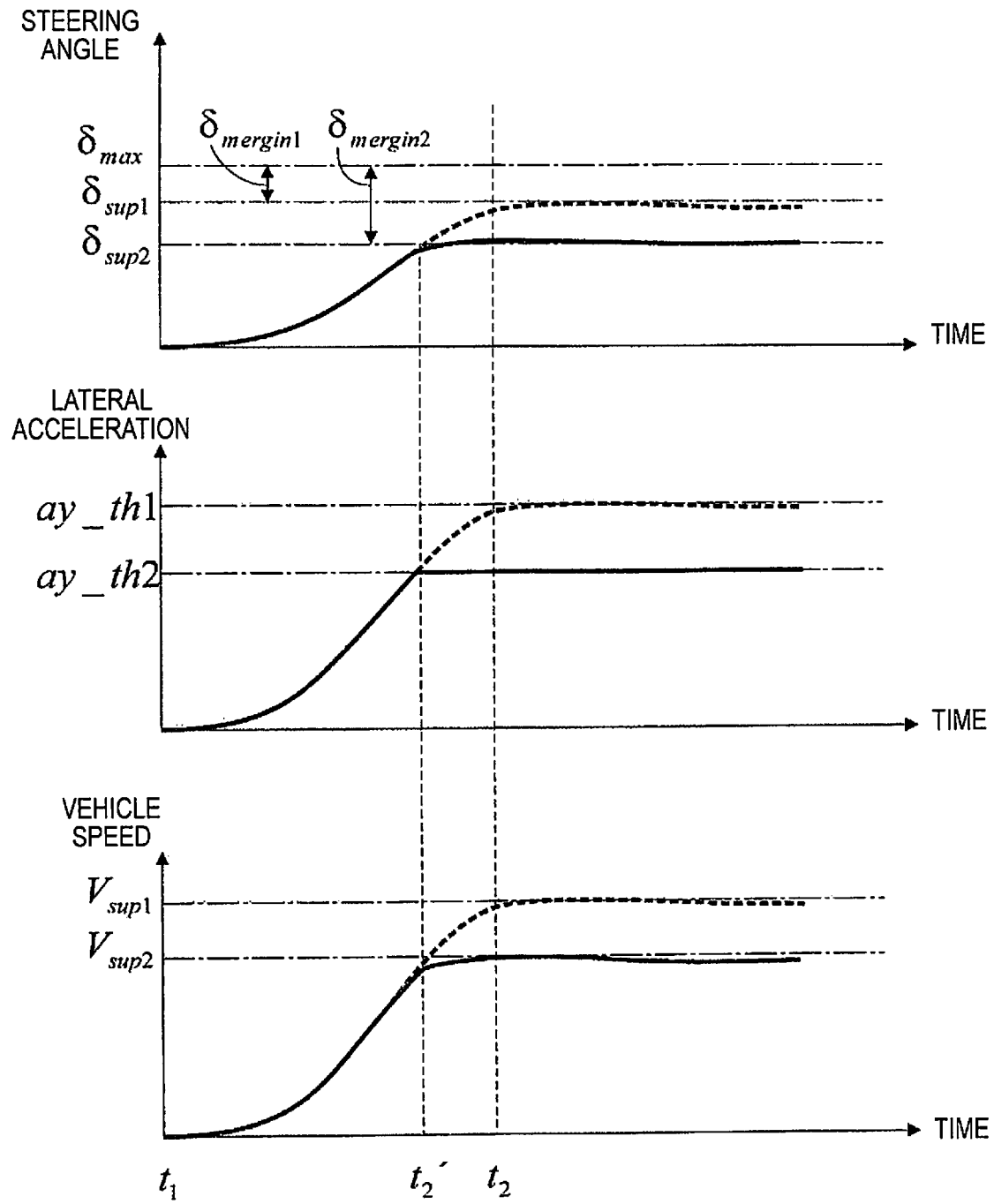
FIG. 9 is a time chart showing a steering angle profile, a lateral acceleration profile, and a vehicle speed profile in which a target steering angle, a target lateral acceleration, and a target vehicle speed of the host vehicle are represented with respect to time in a case in which the host vehicle is turning on a curved route in a situation where there is a vehicle traveling on the outside-peripheral-side curved route.

Operation of Curved-Route Travel Control In Situation where there is a Vehicle Traveling on Outside-Peripheral-Side Curved Route FIG. 7 shows an overview of a case in which the host vehicle is turning on a curved route in a situation where there is a vehicle traveling on the outside-peripheral-side curved route. FIG. 8 shows a change in position of the host vehicle over time in the same situation. FIG. 9 shows a various profiles with respect to time in the same situation. An operation of curved-route travel control in a situation where there is a vehicle traveling on the outside-peripheral-side curved route is described below on the basis of FIGS. 7 to 9.

FIG. 7 shows a scenario in which a host vehicle A enters a curved route on a host-vehicle travel lane C while following a leading vehicle B according to a headway control system, and the leading vehicle B accelerates while traveling on the curved route. In this scenario, a recognition sensor 1 (camera, radar, laser, sonar, etc.) installed in the host vehicle is used to determine whether another vehicle F is present on an outside-peripheral-side curved route E included in a recognition range D forward of the host vehicle. As shown in FIG. 7, when another vehicle F is present on the outside-peripheral-side curved route E, an acceleration-prohibited lateral acceleration threshold value ay_th2 for prohibiting acceleration while on a curve is established at a lower value than the acceleration-prohibited lateral acceleration threshold value ay_th1 that is used when another vehicle F is not present on the outside-peripheral-side curved route E.

FIG. 8 shows a scenario in which, when the host vehicle A enters the curved route on the host-vehicle travel lane C, another vehicle F is present on the outside-peripheral-side curved route E. At time $t_1$, when the leading vehicle B has accelerated, the host vehicle A1 starts accelerating according to the headway control system. In a period from time $t_1$, when the host vehicle A1 has started accelerating, to time $t_{2'}$, at which the lateral acceleration generated in the host vehicle A1 is less than or equal to the acceleration-prohibited lateral acceleration threshold value ay_th2, "set prohibit-acceleration flag to 0" is outputted from the curved-route travel controller 34.

Thus, from time $t_1$ to time $t_{2'}$, the host vehicle travels on the curved route such that acceleration during travel on the curved route is permitted, and such that an increase in a steering angle $\delta$ to a steering angle $\delta_{sup2}$, an increase in a lateral acceleration ay to the acceleration-prohibited lateral acceleration threshold value ay_th2, and an increase in a vehicle speed V to a vehicle speed $V_{sup}2$ are permitted, as shown in FIG. 9.

The acceleration-prohibited lateral acceleration threshold value ay_th2, which is an upper-limit value of the lateral acceleration ay, is established at a value lower than the acceleration-prohibited lateral acceleration threshold value ay_th1. Therefore, even if an increase in the lateral acceleration ay to the acceleration-prohibited lateral acceleration threshold value ay_th2 is permitted, a travel trajectory G1' from a position of the host vehicle A1 to that of the host vehicle A2' does not veer or deviate toward the outside-peripheral-side curved route E from a trajectory in the center of the host-vehicle travel lane C that is the desired trajectory during travel on a corner route from the position of the host vehicle A1 to that of the host vehicle A2' in FIG. 8.

At time $t_{2'}$ in FIG. 8, when the lateral acceleration generated in the host vehicle A2' reaches the acceleration-prohibited lateral acceleration threshold value ay_th2 for prohibiting acceleration during travel on a curved route, "set prohibit-acceleration flag to 1" is outputted from the curved-route travel controller 34. Thus, acceleration during travel on the curved route is prohibited, and after time $t_{2'}$ has occurred, the host vehicle travels on the curved route while the steering angle $\delta_{sup2}$ (less than $\delta_{sup1}$) at time $t_{2'}$, the lateral acceleration (acceleration-prohibited lateral acceleration threshold value ay_th2) at time $t_{2'}$ and the vehicle speed $V_{sup}2$ (less than $V_{sup}1$) at time $t_{2'}$ are maintained, as shown in FIG. 9.

The acceleration-prohibited lateral acceleration threshold value ay_th2 is established at an even lower value than the acceleration-prohibited lateral acceleration threshold value ay_th1. Therefore, when the acceleration-prohibited lateral acceleration threshold value ay_th2 is maintained, a travel trajectory G2' from a position of the host vehicle A2' to that of the host vehicle A3 does not deviate from the desired trajectory and does not approach the other vehicle F present on the outside-peripheral-side curved route E unless the curve radius toward the front decreases during travel on the corner route from the position of the host vehicle A2' to that of the host vehicle A3 in FIG. 8.

At time $t_3$ in FIG. 8, when an effort has been made to maintain the trajectory in the center of the host-vehicle travel lane C, the curve radius toward the front of the host vehicle A3 decreases, and a travel trajectory G3 of the host vehicle A3 is changed to a travel trajectory G3'. In this case, as shown in FIG. 9, it is possible to turn further, due to steering assistance, by a margin $\delta_{mergin2}$ (greater than $\delta_{mergin1}$) from the steering angle $\delta_{sup2}$ when acceleration is prohibited due to the acceleration-prohibited lateral acceleration threshold value ay_th2 to a steering-angle limit $\delta_{max}$ in the steering assistance. Therefore, even when the travel trajectory G3 from the host vehicle A3 changes to the travel trajectory G3', the host vehicle A3 will achieve curved-route travel along the travel trajectory G3' that is the desired trajectory from the host vehicle A3 and will not deviate from the desired trajectory, as long as it is possible to respond within the range of turning further by the further-increased steering angle $\delta$.

Effects of the present disclosure are described next. In the method and device for controlling travel of a drive-assisted vehicle in the first embodiment, the effects listed below are obtained.

(1) The present disclosure is provided with a controller (curved-route travel controller 34) that suppresses acceleration of a host vehicle A on a curved route during travel along a host-vehicle travel lane C. In the method for controlling travel of a drive-assisted vehicle, a curved route is detected on the host-vehicle travel lane C on which the host vehicle A travels (step S2 in FIG. 3). It is detected whether another vehicle is present in the vicinity of the host vehicle (step S4 in FIG. 3). During travel on the curved route, a turning behavior threshold value (acceleration-prohibited lateral acceleration threshold value) established as a boundary value for suppressing acceleration of the host vehicle A is established so as to be lower when another vehicle F is present on an outside-peripheral-side curved route E adjacent to the host-vehicle travel lane C than when another vehicle F is not present on the outside-peripheral-side curved route E (steps S5 to S8 in FIG. 3). A turning behavior index value (acceleration information), which is a value for evaluating a turning behavior state of the host vehicle A, is acquired during travel on the curved route, and a determination is made as to whether the turning behavior index value is greater than the turning behavior threshold value (steps S9 to S11 in FIG. 3). Upon determining that the turning behavior index value is less than or equal to the turning behavior threshold value, accelerating travel on the curved route is permitted, but upon determining that the turning behavior index value is greater than the turning behavior threshold value, accelerating travel on the curved route is suppressed (steps S12 to S14 in FIG. 3). Therefore, it is possible to provide a method for controlling travel of a drive-assisted vehicle in which apprehensiveness on the part of a driver is reduced while allowing for a greater number of situations where it is possible to accelerate on a curved route.

(2) A determination is made as to whether the other vehicle F present on the outside-peripheral-side curved route E adjacent to the host-vehicle travel lane C is approaching the host vehicle A (step S6 in FIG. 3). The turning behavior threshold value (acceleration-prohibited lateral acceleration threshold value) is established so as to be lower upon determining that the other vehicle F present on an outside-peripheral-side curved route E adjacent is approaching the host vehicle A than upon determining that the other vehicle F is not approaching the host vehicle A (steps S7 and S8 in FIG. 3). Therefore, in addition to the effect in (1) above, it is possible to allow for an even greater number of situations where it is possible to accelerate on a curved route. Specifically, when another vehicle F is present on the outside-peripheral-side curved route E adjacent to the host-vehicle travel lane C, the driver feels more apprehensive in a case in which the other vehicle F approaches the host vehicle A, and reduction of this apprehensiveness is prioritized. However, in a case in which the other vehicle F is not approaching the host vehicle A, the driver feels less apprehensive, and elimination of driver dissatisfaction that would arise when acceleration is limited is thereby prioritized.

(3) The turning behavior threshold value for suppressing acceleration of the host vehicle A is configured as a lateral acceleration threshold value (acceleration-prohibited lateral acceleration threshold value). The turning behavior index value of the host vehicle A is configured as lateral acceleration information related to the host vehicle A (steps S7 to S11 in FIG. 3). Therefore, in addition to the effects in (1) and (2) above, it is possible to suitably control lateral movement of the host vehicle A by merely monitoring one piece of lateral acceleration information during travel on the curved route.

(4) An estimated lateral acceleration estimated and computed according to a curve curvature and a vehicle speed, and a lateral acceleration generated in the host vehicle A and detected by a lateral acceleration sensor 9, are used as the lateral acceleration information related to the host vehicle (steps S9 to S11 in FIG. 3). Therefore, in addition to the effect in (3) above, it is possible to monitor one piece of lateral acceleration information using two types of values, i.e., a computed value and a detected value, during travel on the curved route, thereby optimizing determination of conditions for permitting or suppressing accelerating travel on the curved route.

(5) While the estimated lateral acceleration is determined to be less than or equal to the lateral acceleration threshold value (acceleration-prohibited lateral acceleration threshold value), or while the lateral acceleration generated in the host vehicle A is determined to be less than or equal to the lateral acceleration threshold value, accelerating travel on the curved route is permitted. When the estimated lateral acceleration is determined to be greater than the lateral acceleration threshold value, or when the lateral acceleration generated in the host vehicle A is determined to be greater than the lateral acceleration threshold value, accelerating travel on the curved route is suppressed (steps S10 to S14 in FIG. 3). Therefore, in addition to the effect in (4) above, the determination conditions for suppressing accelerating travel on the curved route become stricter, thereby making it possible to allow for a greater number of situations where it is possible to accelerate on a curved route.

(6) The present disclosure is provided with a controller (curved-route travel controller 34) that suppresses acceleration of a host vehicle A on a curved route during travel along a host-vehicle travel lane C. In the device for controlling travel of a drive-assisted vehicle, the controller (curved-route travel controller 34) has a curved-route-detecting unit 34a, an another-vehicle-detecting unit 34f, a threshold-value-establishing unit 34b (turning-behavior-threshold-value-setting unit), a lateral-acceleration-determining unit 34d (turning-behavior-index-value-determining unit), and a turning-acceleration-controlling unit 34e. The curved-route-detecting unit 34a detects a curved route on the host-vehicle travel lane C on which the host vehicle A is traveling. The other-vehicle-detecting unit 34f detects whether another vehicle F is present in the vicinity of the host vehicle A. During travel on the curved route, the threshold-value-establishing unit 34b establishes a turning behavior threshold value (acceleration-prohibited lateral acceleration threshold value) established as a boundary value for suppressing acceleration of the host vehicle A, said threshold value being established so as to be lower when another vehicle F is present on an outside-peripheral-side curved route E adjacent to the host-vehicle travel lane C than when another vehicle F is not present on the outside-peripheral-side curved route E. The lateral-acceleration-determining unit 34d acquires a lateral acceleration (turning behavior index value), which is a value for evaluating a turning behavior state of the host vehicle A, during travel on the curved route, and determines whether the turning behavior index value is greater than the turning behavior threshold value. Upon determining that the turning behavior index value is less than or equal to the turning behavior threshold value, the turning-acceleration-controlling unit 34e permits accelerating travel on the curved route, but upon determining that the turning behavior index value is greater than the turning behavior threshold value, the turning-acceleration-controlling unit 34e suppresses accelerating travel on the curved route (FIG. 2). Therefore, it is possible to provide a device for controlling travel of a drive-assisted vehicle in which apprehensiveness on the part of a driver is reduced while allowing for a greater number of situations where it is possible to accelerate on a curved route.

The method and device for controlling travel of a drive-assisted vehicle according to the present disclosure are described above on the basis of the first embodiment. However, the specific configuration of the present disclosure is not limited by the first embodiment; various design changes, additions, and other such modifications are permitted insofar as these modifications do not depart from the gist of the invention according to the claims.

In the first embodiment, an example was described in which the acceleration-prohibited lateral acceleration threshold value was used as the turning behavior threshold value established as the boundary value for suppressing acceleration of the host vehicle A, and in which the lateral acceleration was used as the turning behavior index value, which is a value for evaluating a turning behavior state of the host vehicle A. However, the turning behavior threshold value and turning behavior index value are not limited to lateral acceleration. Instead, inter alia, a combination of yaw rate and vehicle speed, a combination of steering angle and vehicle speed, the steering angle alone, the amount of displacement from a target trajectory on a curve, or a lateral position from the host vehicle to a white line may be used as these values. In short, these values are to be index values for evaluating the turning behavior state of the host vehicle.

In the first embodiment, an example (with an acceleration gradient set to 0) was described in which acceleration on a curved route was prohibited using a prohibit-acceleration flag as suppression of accelerating travel on a curved route. However, limiting the acceleration gradient on a curved route so as to be low is another example of suppression of accelerating travel on a curved route.

In the first embodiment, an example was described in which the map data 4 and host-vehicle position information derived from the GPS 2 were used to detect a curved route and an outside-peripheral-side curved route. However, other examples of detecting a curved route and an outside-peripheral-side curved route include: detection according to lateral acceleration or data based on an on-board device such as radar; and detection using information acquired according to vehicle-to-vehicle communication, route-to-vehicle communication, etc.

In the first embodiment, an example was described in which, as a timing for detecting a curved route and an outside-peripheral-side curved route, the map data 4 and the host-vehicle position information derived from the GPS 2 were used to predict the curved route while on a linear route before entering the curved route. However, a timing during travel on a curved route from the start of entering the curved route to the end of exiting the curved route may also be used as the timing for detecting the curved route and the outside-peripheral-side curved route.

In the first embodiment, an example was described in which the curve curvature used in estimating the lateral acceleration was acquired from the map data 4. However, the curve curvature used in estimating the lateral acceleration may be acquired in real time by a camera etc., or may be acquired from pre-collected map information etc.

In the first embodiment, an example was described in which white line information was acquired in real time by an on-board camera. However, the white line information may be acquired from pre-collected map information etc.

In the first embodiment, an example was described in which the lateral acceleration generated in the host vehicle was acquired by the lateral acceleration sensor 9. However, the lateral acceleration generated in the host vehicle may be a value estimated using a steering angle from a steering angle sensor and a yaw rate from a yaw rate sensor.

In the first embodiment, an example was described in which the method and device for controlling travel according to the present disclosure were applied to a drive-assisted vehicle that has, as a base, an electric-powered vehicle including motor driving, the drive-assisted vehicle exhibiting, when an autonomous driving mode is selected, an autonomous drive function derived from control over steering/driving/braking along a lane in which a host vehicle is traveling. However, the method and device for controlling travel according to the present disclosure can also be applied to hybrid vehicles equipped with both a motor and an engine as drive sources, and can also be applied to engine vehicles equipped with only an engine as a drive source. In addition, the method and device for controlling travel according to the present disclosure can also be applied to vehicles in which driving by a driver is assisted by displaying a speed limit or a steering-angle limit during travel on a curved route, drive-assisted vehicles in which a speed limit control is executed during travel on a curved route, or drive-assisted vehicles in which a steering-angle limit control is executed during travel on a curved route. Furthermore, the method and device for controlling travel according to the present disclosure can also be applied to, inter alia, autonomous driving vehicles that exhibit a fully-automatic drive function including lane changes in accordance with a surrounding environment when an autonomous driving mode is selected.

The invention claimed is:

1. A drive-assisted vehicle control method for controlling travel of a host vehicle comprising a controller that suppresses acceleration of the host vehicle on a curved route during travel along a host-vehicle travel lane, the drive-assisted vehicle control method comprising:
    detecting the curved route on the host-vehicle travel lane on which the host vehicle is traveling;
    detecting whether another vehicle is present in a vicinity of the host vehicle;
    establishing a turning behavior threshold established as a boundary value for suppressing acceleration of the host vehicle during travel on the curved route, the turning behavior threshold being established so as to be lower when another vehicle is present on an outside-peripheral-side curved route adjacent to the host-vehicle travel lane than when another vehicle is not present on the outside-peripheral-side curved route;
    acquiring a turning behavior index, which is a value for evaluating a turning behavior state of the host vehicle during travel on the curved route, and determining whether the turning behavior index is greater than the turning behavior threshold; and
    permitting accelerating travel on the curved route upon determining that the turning behavior index is less than or equal to the turning behavior threshold, but suppressing accelerating travel on the curved route upon determining that the turning behavior index is greater than the turning behavior threshold.

2. The drive-assisted vehicle control method according to claim 1, comprising:
    determining whether another vehicle present on the outside-peripheral-side curved route adjacent to the host-vehicle travel lane is approaching the host vehicle, and
    establishing the turning behavior threshold so as to be lower upon determining that the other vehicle present on the outside-peripheral-side curved route is approaching the host vehicle than when the other vehicle is not approaching the host vehicle.

3. The drive-assisted vehicle control method according to claim 1, comprising:
    configuring the turning behavior threshold for suppressing acceleration of the host vehicle as a lateral acceleration threshold, and
    configuring the turning behavior index of the host vehicle as lateral acceleration information related to the host vehicle.

4. The drive-assisted vehicle control method according to claim 3, comprising:
    using an estimated lateral acceleration that is estimated and computed according to a curve curvature and a vehicle speed, and a lateral acceleration generated in the host vehicle and detected by a lateral acceleration sensor, as the lateral acceleration information related to the host vehicle.

5. The drive-assisted vehicle control method according to claim 4, comprising:
    permitting accelerating travel on the curved route upon determining that the estimated lateral acceleration is less than or equal to the lateral acceleration threshold, or upon determining that the lateral acceleration generated in the host vehicle is less than or equal to the lateral acceleration threshold; and
    suppressing accelerating travel on the curved route upon determining that the estimated lateral acceleration is greater than the lateral acceleration threshold, or upon determining that the lateral acceleration generated in the host vehicle is greater than the lateral acceleration threshold.

6. A drive-assisted vehicle control device for controlling travel of a host vehicle comprising:
    a controller that suppresses acceleration of the host vehicle on a curved route during travel along a host-vehicle travel lane,
    the controller comprising:
    a curved-route-detecting unit that detects a curved route on the host-vehicle travel lane on which the host vehicle is traveling;
    an another-vehicle-detecting unit that detects whether another vehicle is present in the vicinity of the host vehicle;
    a turning-behavior-threshold-establishing unit that establishes a turning behavior threshold established as a boundary value for suppressing acceleration of the host vehicle during travel on the curved route, the turning behavior threshold value being established so as to be lower when another vehicle is present on an outside-peripheral-side curved route adjacent to the host-vehicle travel lane than when another vehicle is not present on the outside-peripheral-side curved route;
    a turning-behavior-index-determining unit that acquires a turning behavior index, which is a value for evaluating a turning behavior state of the host vehicle, during travel on the curved route, and determines whether the turning behavior index is greater than the turning behavior threshold; and
    a turning acceleration control unit that permits accelerating travel on the curved route upon determining that the turning behavior index is less than or equal to the turning behavior threshold, but suppresses accelerating travel on the curved route upon determining that the turning behavior index is greater than the turning behavior threshold.

* * * * *